June 9, 1936.  C. L. EKSERGIAN  2,043,951
VEHICLE WHEEL
Filed June 7, 1932
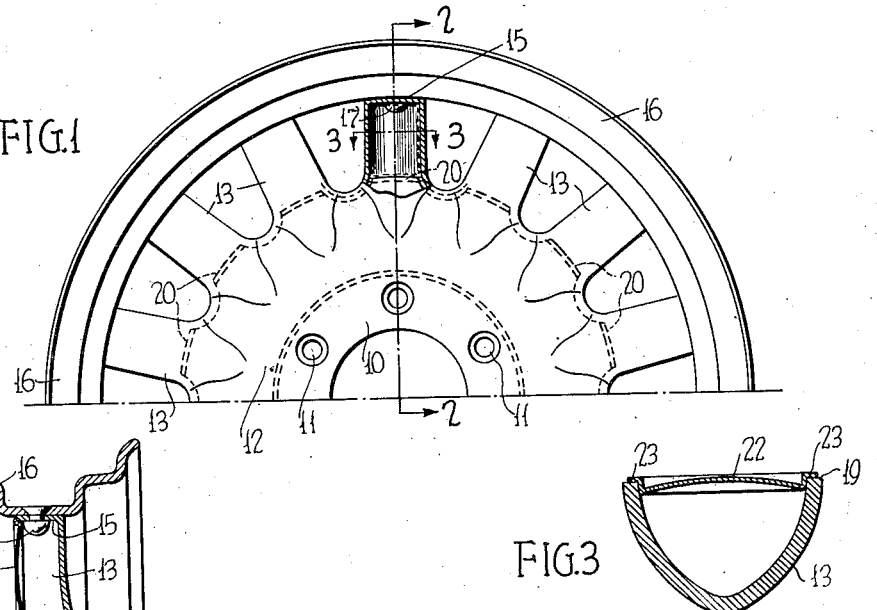
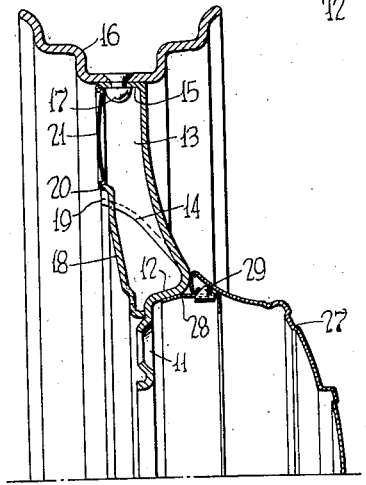
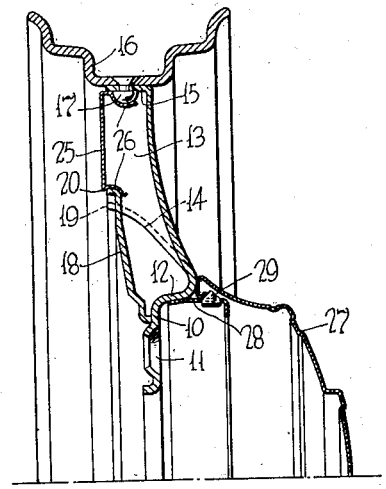
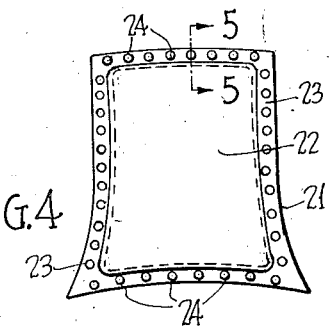
INVENTOR.
CAROLUS L. EKSERGIAN.
BY
ATTORNEY.

Patented June 9, 1936

2,043,951

UNITED STATES PATENT OFFICE 2,043,951

VEHICLE WHEEL

Carolus L. Eksergian, Detroit, Mich., assignor to Budd Wheel Company, Philadelphia, Pa., a corporation of Pennsylvania Application June 7, 1932, Serial No. 615,887

8 Claims. (Cl. 301—64)

The invention relates to vehicle wheels, and particularly to methods of precluding the entry of foreign matter to the interior of wheel bodies having open and exposed portions.

The prime object of my invention is to provide means for satisfactorily precluding the entry of dirt, water, or other foreign matter to the interior of the spokes of a vehicle wheel. Other objects, incidental to the main object, relate to improvements in detail, such as improved methods of wheel fabrication.

Broadly, the objects of my invention have been attained by the provision of closure members for the spokes, to be secured thereto by means hereinafter to be described.

Other objects and advantages will be apparent after a reading of the sub-joined specification, in light of the attached drawing, in which, Figure 1 is a partial elevational view of a vehicle wheel embodying my invention, parts being shown in section.

Figure 2 is a detail cross sectional view taken on line 2—2 of Figure 1.

Figure 3 is a detail cross sectional view through a spoke, taken on line 3—3 of Fig. 1.

Figure 4 is an elevational view of preferred form of closure member.

Figure 5 shows an enlarged cross sectional view of a portion of the closure member and is taken on line 5—5 of Fig. 4.

Figure 6 is a view similar to Fig. 2, showing a modified form of my invention.

Referring now to the drawing by reference characters, I have preferred to illustrate my invention as embodied in a vehicle wheel of the latest design, comprising a wheel body having a central annular radially extending portion 10 having a series of securing holes 11, through which the wheel body, as a whole, is secured to the usual wheel hub flange, not shown. This radial portion 10 comprises a part of the nave of the wheel, which also includes a frusto-conical portion 12 extending axially outwardly of the wheel. A demountable hub cap 27 is secured to a sheet metal annulus 28, embodying a series of spring clips 29, and preferably spot welded to the inner face of frusto-conical portion 12. A series of rearwardly presenting channel section spokes 13 are formed integrally with the nave portion in a single stamping. The base 14 of the respective spokes is reversely conical as respects the conical nave portion 12, terminating in a radial plane adjacent the medial plane of the wheel. The outer end of each spoke 13 is closed by the metal of the spoke itself, as indicated at 15, and it is through this closed end portion that I prefer to fasten the spokes to the rim 16 of the drop center type, as by riveting, as indicated at 17, or by spot welding.

It will be seen that the spoke body heretofore described is normally open at the rear face, and is thus accessible for the entry of dirt and foreign material, the presence of which within a wheel would deleteriously affect the same, causing noise and the formation of rust. The entry of mud into the open portions of the wheel body would also tend to increase the weight thereof in unequal measures, tending to throw the wheel body off balance and undeniably affecting the performance of the vehicle. It thus appears advisable that some means be provided to close the open sides of the channel section spokes, in order to prevent the entry of foreign material thereinto. It is further desirable to close and stiffen the generally triangular section defined by the base 14 of the respective spokes and the frusto-conical portion 12 of the nave. I have sought to provide these desirable features by means characterized by the utmost simplicity and general utility of design.

The enclosing and stiffening of the wheel body and nave is afforded by a reinforcing element 18 which may consist of a series of separate plates, or an annulus, leading from the outer perimetrical region or zone of the radial portion 10 radially outwardly to the rear edge 19 of the bases 14 of the respective spokes 13. As shown clearly in Fig. 1, this reinforcing member 18 is provided with portions indented outwardly into the spokes as indicated at 20. This reinforcing member 18, preferably in the form of an annulus, may be secured to the rear edge 19 of the respective spokes 13, and to the radial portion 10 of the wheel body by being welded thereto. The provision of this member completes the generally triangular cross section of the nave and the bases of the spokes, strengthening this region as a whole.

In order to preclude the entry of foreign matter into the interior of spokes 13, I provide a series of light gauge sheet metal closures or caps 21, each having preferably an arched body portion 22, and flanged channel edges 23. The contour of each closure member 21 corresponds closely to the generally rectangular contour defined by the radially extending edges of the spokes 13, the end 15 of the spokes 13 and the indented portions 20 of the reinforcing member 18. According to a preferred form of my invention, I provide a series of projections 24 in the radially outer and radially inner flanged edges of each closure member 21, the construction of these projections being shown by the enlarged cross section in Fig. 5. These projections may also be provided along the radially extending edges of each closure member 21. In accordance with the practice of my invention, I insert the closure member 21 in the rear or each spoke 13, and by applying suitable welding dies and welding current, I projection weld these members in a manner which will be at once apparent. I may projection weld the radially inner and radially outer flanged edges 23 of the closure member or I may projection weld each of the marginal edges 23 of this member to the metal of the spoke edges, spoke end, and reinforcing member 18. As a modification, I may projection weld the radially inner and radially outer edges 23 and arc or roller weld the radially extending edges 23 to the respective wheel parts. When the closure member 21 is in fully assembled position with respect to the wheel body, the outside wall portions of the channel section will lie snugly within the rearwardly extending edges of the spokes 13, providing an extremely tight closure therefore, entirely satisfactory for the preclusion of the entry of foreign material thereinto.

A modified embodiment of my invention is shown in Fig. 6, in which a series of removable closure members 25 are provided. By forming suitable indented portions 26 corresponding respectively to the shape of the head of the rivet 17 and to the radially outer edge of the indented portion 20 of reinforcing member 18, I am able to secure closures 25 by merely snapping these indented portions 26 over their respective wheel parts.

Summarizing, it will be seen that I have provided an extremely novel and simple means for precluding the entry of foreign matter to the interior of the wheel. The metal closures 21 or 25 may be made as simple stampings, the projections 24 being formed in the stamping step. The securement of these members to the wheel body is of the simplest nature, requiring no complicated machinery nor great amount of time. The welds afforded by the series of closely positioned projections have a tendency to spread somewhat, giving in effect, a continuous weld throughout the extent of contact between the closure members and the respective wheel members.

Modifications of the invention will be obvious to those skilled in the art, and the appended claims therefore should be read with a breadth of understanding commensurate with the generic spirit of my invention.

What I claim is:

1. A vehicle wheel comprising, in combination, a single stamping embodying channel section spokes and a nave portion, a reinforcing member interconnecting said spokes and said nave portion, said reinforcing member having portions thereof indented outwardly into interlocking relationship with respect to the said spokes, and a separate metallic cap closing the open side of each spoke and secured to the edges of said spoke and to the indented portions of said reinforcing member.

2. A wheel comprising a nave, a rim, a channel section spoke having a closed end, means securing the spoke to the rim including a rivet having a head in the spoke, and a removable closure member for the open side of said channel section spoke including a metallic element adapted to snap over said rivet head and the outer perimeter of said nave.

3. A wheel comprising a nave, a rim, a channel section spoke having a closed end, a reinforcing member interconnecting said nave and said spokes, means securing the spoke to the rim including a rivet having a head in the spoke, and a removable closure member for the open side of said channel section spoke including a metallic element adapted to snap over said rivet head and a portion of said reinforcing member.

4. A vehicle wheel comprising in combination, a rim and an integral pressed metal wheel body having rearwardly opening hollow channel section spokes integral with and extending radially from a substantially radially extending nave portion, said nave portion being integral with a hub detachable type mounting flange, and a separate thin sheet metal cover closing the open side of each of said spokes, said cover having locating shoulders engaging the axially extending walls of said spokes, and edge flanges projecting from said shoulders into overlapping relation with and welded to the axially inwardly facing edges of the spoke walls.

5. A wheel comprising a nave and mounting flange, a rim, a plurality of channel section spokes having closed outer ends, said spokes and nave being integral pressed metal, means securing the spokes to the rim, a reinforcing member interconnecting the nave periphery and the mounting flange, and a closure member for the open side of each channel section spoke including a metallic element welded to the edges and end of said spoke and to a portion of said reinforcing member.

6. A vehicle wheel comprising a rim, and a spoked spider member having a radially extending mounting flange, a hollow axially extending hub shell portion, a plurality of radially extending closed outer end U-section spokes integral with said hub shell portion and opening axially inwardly of the wheel, an annulus closing the axially inner end of said hub shell portion, and a plurality of cover plates closing the axially inner sides of the spokes, said cover plates having offset peripheral portions overlapping and welded to the side and end walls of the spokes and peripheral portions of said annulus, said annulus connecting said hub shell portion and mounting flange and secured to said portion and said flange.

7. A vehicle wheel comprising in combination, a rim member, a single stamping demountable type wheel body comprising a mounting flange portion and an angularly substantially radially extending nave portion outwardly thereof and a plurality of hollow axially facing channel section spokes having their root portions pressed from the nave and extending radially to the rim and terminating thereat in axially extending integral end closure portions, a member interconnecting said spokes and said nave portion and having portions thereof indented substantially radially into interlocking relationship with respect to the spokes, and a separate metallic cap closing the open side of each spoke and engaging the edges of the spoke and the indented portions of the interconnecting member.

8. As an article of manufacture, a sheet metal cover for axially presenting open sided channel section spokes, said cover having a main body of arched contour and locating shoulders adjacent its edges adapted for engagement with the axially extending side walls of the spokes and edge flanges extending from said shoulders and adapted to overlap the axially extending edges of the spoke walls.

CAROLUS L. EKSERGIAN.